UNITED STATES PATENT OFFICE.

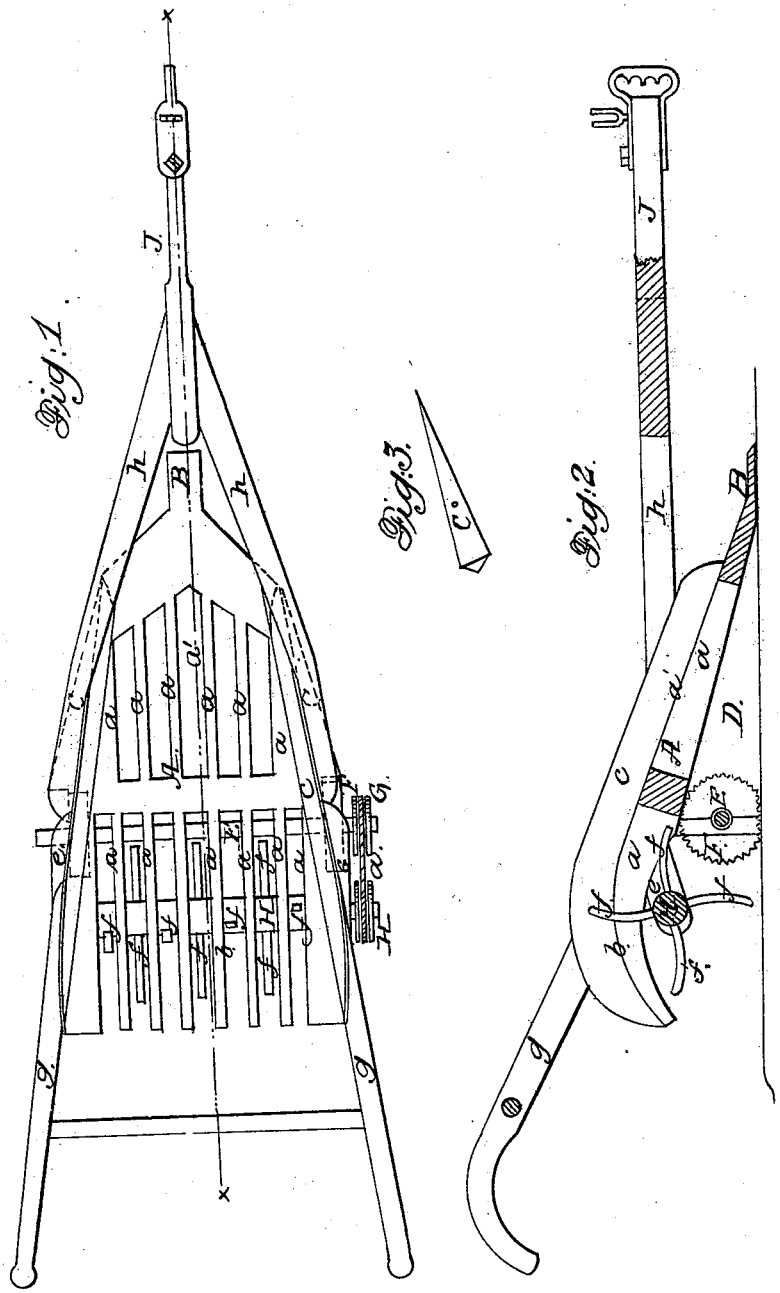

DANIEL N. DENMAN, OF MILLBURN, NEW JERSEY.

IMPROVEMENT IN POTATO-DIGGERS.

Specification forming part of Letters Patent No. 44,288, dated September 20, 1864; antedated September 5, 1864.

*To all whom it may concern:*

Be it known that I, D. N. DENMAN, of Millburn, in the county of Essex and State of New Jersey, have invented a new and Improved Potato Digger and Cultivator; and I do hereby declare that the following is a full, clear, and exact description of the same, reference being had to the accompanying drawings, making a part of this specification, in which—

Figure 1 is a plan or top view of my invention; Fig. 2, a side sectional view of my invention, taken in the line $x\ x$, Fig. 1; Fig. 3, a detached perspective view of a landside pertaining to the same.

Similar letters of reference indicate corresponding parts in the several figures.

This invention consists in the employment or use of an inclined curved screen provided with a share and landside, and having a toothed shaft placed underneath the back and curved part of the screen, the teeth of the shaft working through the screen, and the shaft being rotated by a traction-wheel placed behind one or each of the landsides, all arranged as hereinafter fully shown and described, whereby a very simple and efficient potato-digger is obtained, and one that may be advantageously used for cultivating or preparing the earth for the reception of seeds, &c.

To enable those skilled in the art to fully understand and construct my invention, I will proceed to describe it.

A represents a screen formed of longitudinal bars $a$, said screens being flat or in the form of a plane at its lower part, as shown at $a'$, and curved at its back part, as shown at A. (See Fig. 2.) This screen is not of equal width. It gradually widens from its front toward its back end, and at each side there is a raised ledge or fender, $c$. To the lower end of the screen A there is attached a share, B, of V form, and having a landside, C, at each side of it, said landsides projecting back underneath the screen at each side. One of these landsides is shown detached in Fig. 3. They project from side strips, D, which support the screen. Through the back part of these side strips a shaft, E, passes horizontally, having at each end of it a wheel, F, which has a serrated periphery. The wheels F are directly behind the landsides C. On one end of the shaft there is a pulley, G, which has a belt, $d$, passing around it, said belt also passing around a pulley, H, on a shaft, H', the bearings $e$ of which are attached to the sides of the machine. This shaft H' has a series of teeth, $f$, attached to it in spiral rows, said teeth being slightly curved and of such length that they will pass through the spaces between the bars at the back and curved part of the screen. The machine is provided with two handles, $g\ g$, which project back from it in an inclined position.

J is a draft-pole, which is attached to the front ends of two oblique bars, $h\ h$, secured one at each side of the machine. (See Fig. 1.)

The operation is as follows: As the machine is drawn along the share B passes underneath the hills of potatoes, and the earth and potatoes pass up the screen A by the forward movement of the machine. The earth passes through the screen, while the potatoes and weeds are thrown off the back end of the screen by the revolution of the teeth $f$ of the shaft H'. The shaft H' is rotated by the traction-wheels F F on the shaft E, and these wheels are made to perform this function efficiently in consequence of being directly behind the landsides C, as the latter compact the earth underneath them, so that the wheels can obtain a firm hold. The wheels could not be made to rotate the shaft H' if they moved over loose earth. The curved back end of the screen A insures a free discharge of the weeds and potatoes, effectually preventing the choking or clogging of the screens.

This device will answer admirably well for lightening up or pulverizing plowed soil preparatory to sowing seed. All clods will be thoroughly broken by the revolving teeth $f$. It will leave the soil in a much lighter or friable condition than the harrow, as the latter, as is well known, have a tendency while pulverizing the soil to compact it.

Having thus described my invention, what I claim as new, and desire to secure by Letters Patent, is—

In a potato-digger of the construction specified, arranging the two driving-wheels F F directly behind the landsides C C, as herein described, and for the purposes specified.

DANIEL N. DENMAN.

Witnesses:
W. S. PARTRIDGE,
ROBT. H. SOUDER.